US010774748B2

(12) United States Patent
Ryon et al.

(10) Patent No.: US 10,774,748 B2
(45) Date of Patent: Sep. 15, 2020

(54) INTERNAL FUEL MANIFOLDS

(71) Applicant: Delavan Inc, West Des Moines, IA (US)

(72) Inventors: Jason A. Ryon, Carlisle, IA (US); Lev A. Prociw, Johnston, IA (US)

(73) Assignee: Delavan Inc., Des Moines, IA (US)

( * ) Notice: Subject to any disclaimer, the term of this patent is extended or adjusted under 35 U.S.C. 154(b) by 614 days.

(21) Appl. No.: 15/407,972

(22) Filed: Jan. 17, 2017

(65) Prior Publication Data

US 2018/0202364 A1 Jul. 19, 2018

(51) Int. Cl.
*F02C 7/22* (2006.01)
*F02C 7/264* (2006.01)

(52) U.S. Cl.
CPC .............. *F02C 7/222* (2013.01); *F02C 7/264* (2013.01); *F05D 2220/32* (2013.01); *F05D 2230/30* (2013.01); *F05D 2240/35* (2013.01)

(58) Field of Classification Search
None
See application file for complete search history.

(56) References Cited

U.S. PATENT DOCUMENTS

| | | | |
|---|---|---|---|
| 4,854,127 A | 8/1989 | Vinson et al. | |
| 5,713,206 A * | 2/1998 | McWhirter | F23D 14/02 60/737 |
| 6,289,676 B1 * | 9/2001 | Prociw | B05B 1/3489 60/740 |
| 8,863,524 B2 * | 10/2014 | Karlsson | F23R 3/346 60/733 |
| 2009/0255256 A1 * | 10/2009 | McMasters | B22F 3/1055 60/734 |

FOREIGN PATENT DOCUMENTS

| | | |
|---|---|---|
| EP | 2629016 A2 | 8/2013 |
| WO | 2010/024989 A2 | 3/2010 |
| WO | 2016/028974 A1 | 2/2016 |

OTHER PUBLICATIONS

Extended European Search Report issued in corresponding European Patent Application No. EP 18151930.7, dated Jun. 14, 2018.

* cited by examiner

*Primary Examiner* — Steven M Sutherland
*Assistant Examiner* — Rodolphe Andre Chabreyrie
(74) *Attorney, Agent, or Firm* — Locke Lord LLP; Scott D. Wofsy; Joshua L. Jones

(57) ABSTRACT

A fluid manifold including a manifold body having a first annular passage defined between a first wall of the manifold body and a second wall of the manifold body, wherein the second wall is radially inward from the first wall. A second annular passage is nested radially inward of the firsts annular passage, wherein the second annular passage is defined between the second wall of the manifold body and a third wall of the manifold body radially inward from the second wall of the manifold body.

14 Claims, 5 Drawing Sheets

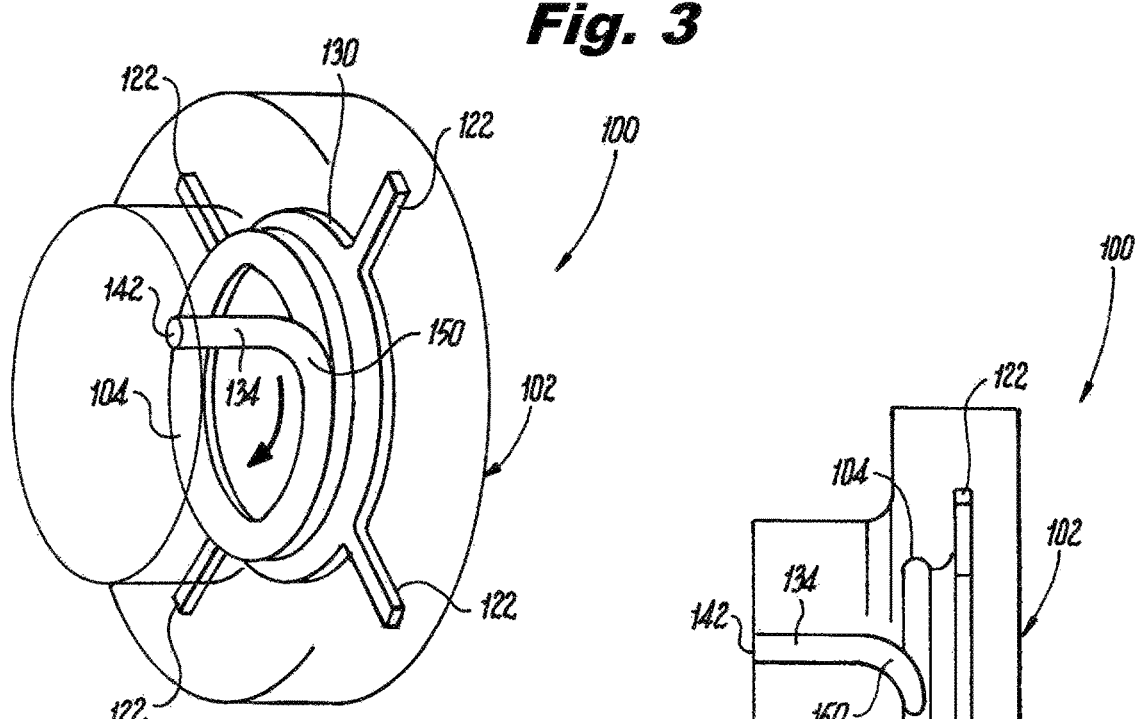
Fig. 3
Fig. 4
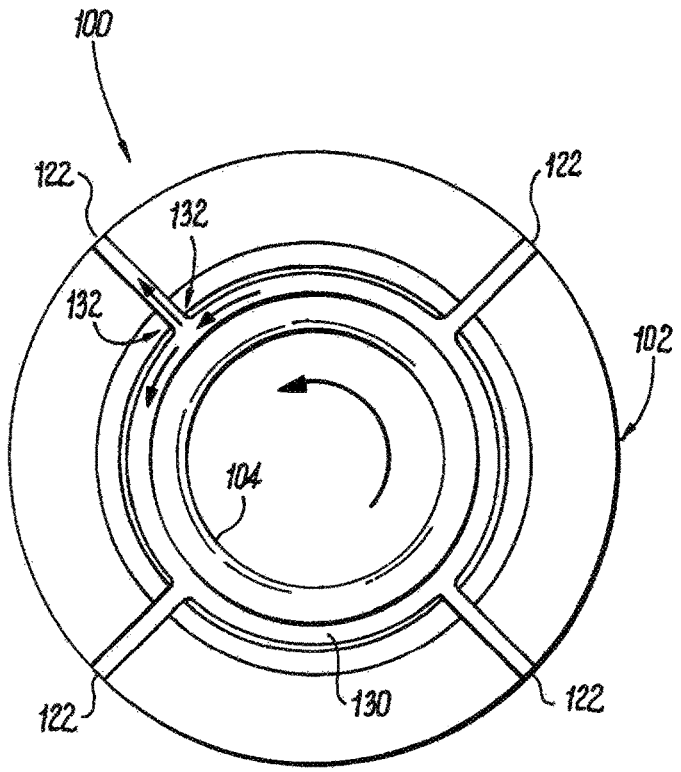
Fig. 5

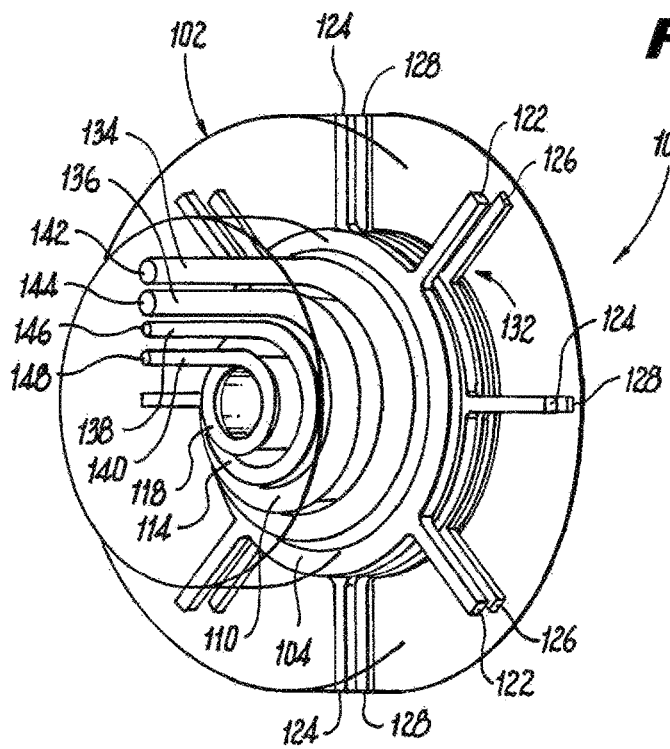
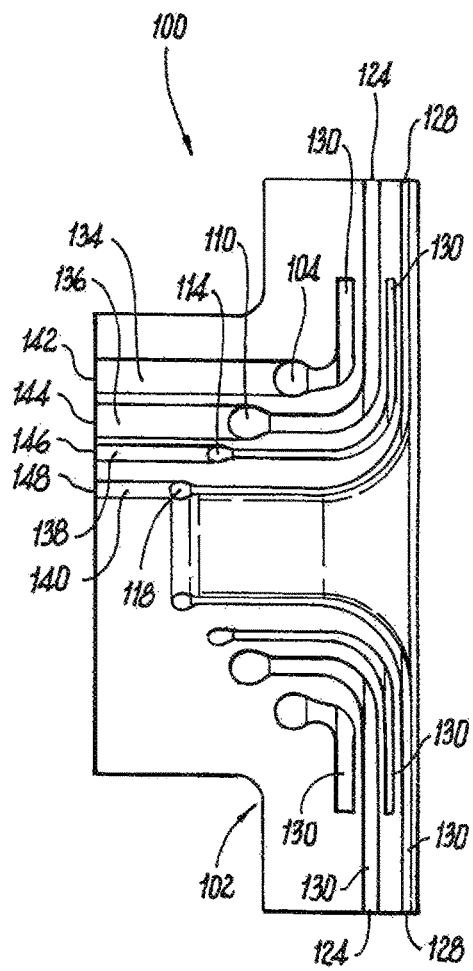
Fig. 6
Fig. 7
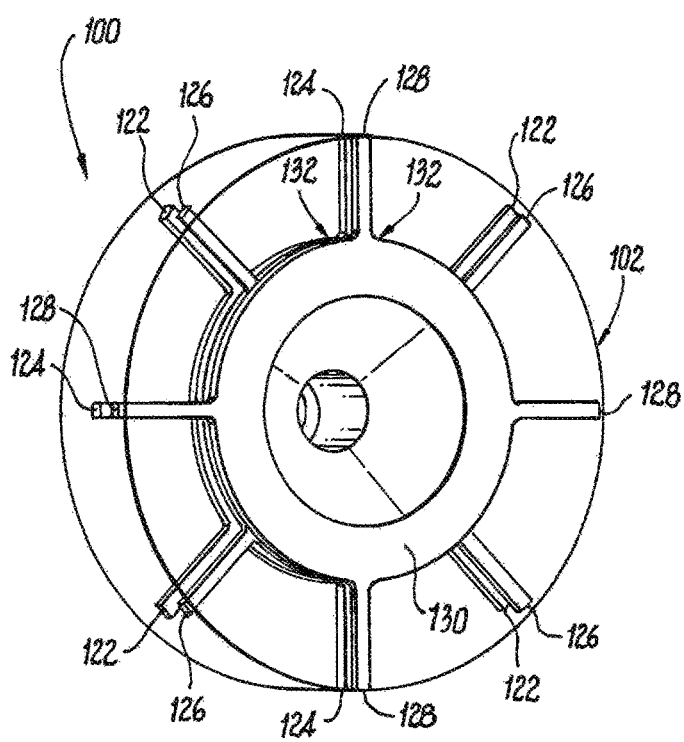
Fig. 8

INTERNAL FUEL MANIFOLDS

BACKGROUND OF THE INVENTION

1. Field of the Invention

The present disclosure relates to fluid manifolds, and more particularly to manifolds such as used in gas turbine engines.

2. Description of Related Art

In gas turbine engines, such as industrial gas turbine engines used for power production, there is often a need to utilize more than one type of fuel. Fuel manifolds can route multiple different types of fuel to suitable injectors within the gas turbine engine. Traditional fuel manifolds are relatively complicated and bulky, especially when multiple fuels must be routed to the engine while remaining in fluid isolation from one another en route. The complicated nature of fuel manifolds is compounded if it is desired to utilize staged fuel injection, e.g., for improved turn down ratios.

The conventional techniques have been considered satisfactory for their intended purpose. However, there is an ever present need for improved fluid manifolds. This disclosure provides a solution for this problem.

SUMMARY OF THE INVENTION

A fluid manifold including a manifold body having a first annular passage defined between a first wall of the manifold body and a second wall of the manifold body, wherein the second wall is radially inward from the first wall. A second annular passage is nested radially inward of the firsts annular passage, wherein the second annular passage is defined between the second wall of the manifold body and a third wall of the manifold body radially inward from the second wall of the manifold body.

A third annular passage can be nested radially inward of the second annular passage. The third annular passage is defined between the third wall of the manifold body and a fourth wall of the manifold body radially inward from the third wall of the manifold body. At least one additional annular passage can be included, wherein a first one of the at least one additional annular passage is nested radially within the third annular passage and is defined between the third wall of the manifold body and a fourth wall of the manifold body radially inward from the third wall of the manifold body. Any additional ones of the at least one additional annular passage can each be nested successively within a respective annular passage and are respectively defined between two respective walls of the manifold body.

Each of the first annular passage and the second annular passage can be defined between a respective pair of trumpet-shaped walls. Each of the first annular passage and the second annular passage can include a plurality of distinct outlet passages branching off therefrom. The outlet passages can be in fluid communication with a radially outward facing surface of the fluid manifold. It is also contemplated that the outlet passages can be in fluid communication with an axially facing surface of the fluid manifold. Each of the outlet passages can extend in a radial direction from a respective annular chamber. Each of the outlet passages can meet the respective annular chamber at a rounded corner. Each of the first annular passage and the second annular passage can include a respective inlet feed passage that feeds into a respective annular passage tangentially to induce spin on fluids flowing therethrough. The inlet feed passages can be in fluid communication with an axial facing surface of the fluid manifold. The manifold body can define a central passage therethrough configured to receive an ignitor. The manifold body including the first wall, second wall, and third wall, can be a single monolithic object.

A system includes a combustor case defining a manifold receptacle bore therethrough. A manifold including a manifold body can be seated in the manifold receptacle to plug seal pressure within the combustor case. The manifold body can include annular passages as described above. An injector can be included having first and second fuel circuits each in fluid communication with the first and second annular passages, respectively.

The manifold can include two additional annular passages in addition to the first annular passage and the second annular passage, wherein each of the two additional annular passages is in fluid communication with a respective fuel circuit in the injector for dual fuel, dual stage fuel injection. An ignitor can be seated in a central passage of the manifold body for ignition of fuel issued from the injector.

A method of making a fluid manifold includes forming a manifold body with multiple, radially nested annular passages therein, wherein each adjacent pair or the radially nested annular passages are separated by a respective wall of the manifold body. Forming the manifold body can include forming the manifold body including at least one wall separating radially nested passages using additive manufacturing.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIGS. 3-5 are perspective, side elevation, and end elevation views of the manifold of FIG. 1, schematically showing one of the annular fuel passages as a sold body for sake of clarity;

FIGS. 6-8 are inlet end perspective, side elevation, and outlet end perspective views of the manifold of FIG. 1, showing all four annular fuel passages as solid bodies for sake of clarity;

DETAILED DESCRIPTION OF THE PREFERRED EMBODIMENTS

Figure 1:
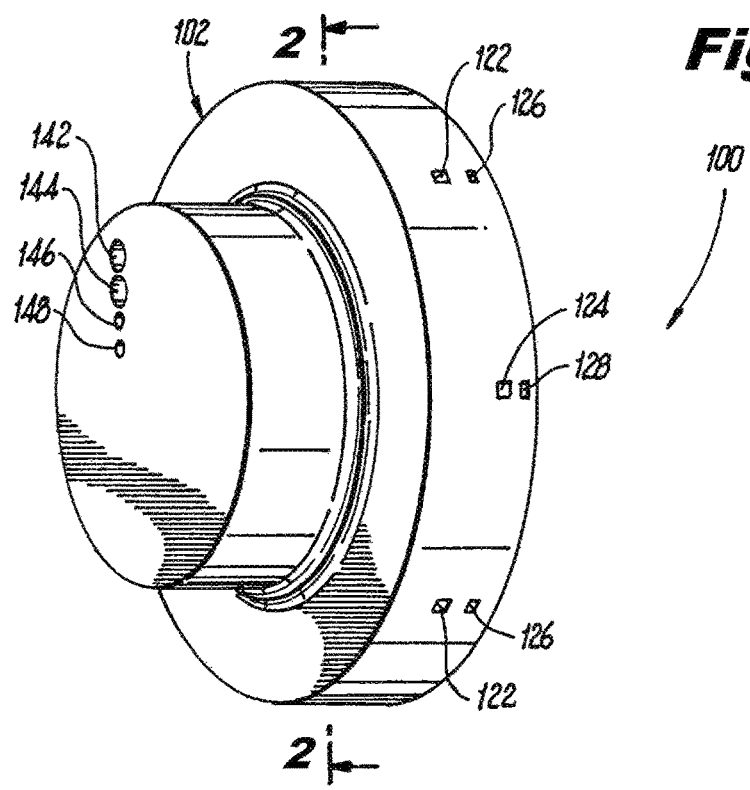
FIG. 1 is a perspective view of an exemplary embodiment of a manifold constructed in accordance with the present disclosure, showing the inlets and outlets for four internal annular passages.
Figure 2:
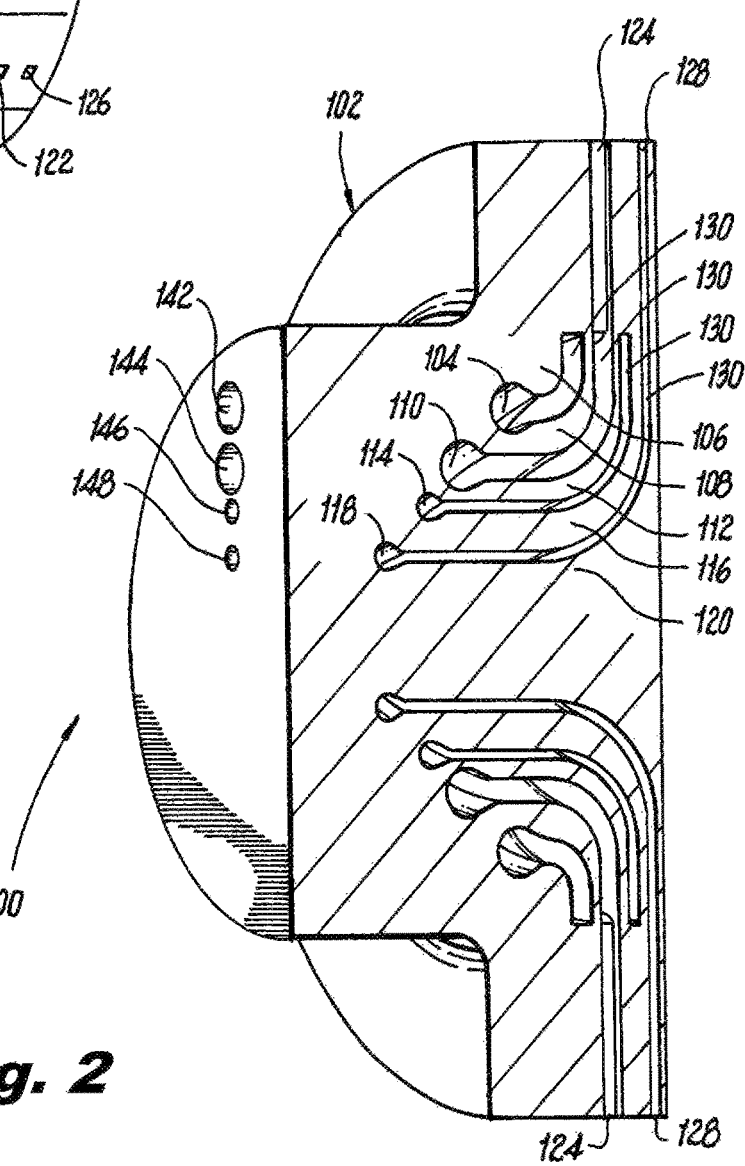
FIG. 2 is a cross-sectional perspective view of the manifold of FIG. 1, showing the four internal annular passages.

Reference will now be made to the drawings wherein like reference numerals identify similar structural features or aspects of the subject disclosure. For purposes of explanation and illustration, and not limitation, a partial view of an exemplary embodiment of a manifold in accordance with the disclosure is shown in FIG. 1 and is designated generally by reference character 100. Other embodiments of manifolds in accordance with the disclosure, or aspects thereof, are provided in FIGS. 2-11, as will be described. The systems and methods described herein can be used to distribute and/or stage multiple fluids including liquids and gases, such as in dual stage, dual fuel injection for gas turbine engines.

Fluid manifold 100 includes a manifold body 102 having a first annular passage 104 defined between a first wall 106 of the manifold body 102 and a second wall 108 of the manifold body 102, wherein the second wall 108 is radially inward from the first wall 106. A second annular passage 110 is nested radially inward of the firsts annular passage 104, wherein the second annular passage 110 is defined between the second wall 108 of the manifold body 102 and a third wall 112 of the manifold body 102 radially inward from the second wall 108 of the manifold body 102. A third annular passage 114 is nested radially inward of the second annular passage 110. The third annular passage 114 is defined between the third wall 112 of the manifold body 102 and a fourth wall 116 of the manifold body 102 radially inward from the third wall 112 of the manifold body 102. A fourth annular passage 118 is nested radially within the third annular passage 114 and is defined between the fourth wall 116 of the manifold body 102 and a fifth wall 120 of the manifold body 102 radially inward from the fourth wall 116 of the manifold body 102. The manifold body 102 including the walls 106, 108, 112, 116, and 120 can be a single monolithic object, e.g., formed by additive manufacturing techniques. While shown and described in exemplary embodiments with four annular passages, those skilled in the art having the benefit of this disclosure will readily appreciate that manifolds having any suitable number of nested annular passages greater than, equal to, or less than four can be made without departing from the scope of this disclosure.

Each of the walls 106, 108, 112, 116, and 120 is generally trumpet-shaped, e.g. extending axially then turning radially outward. Each of the first, second, third, and fourth annular passages 104, 110, 114, and 118 includes a respective plurality of distinct outlet passages 122, 124, 126, and 128 branching off from a respective annular chamber thereof 130. Each of the outlet passages 122, 124, 126, and 128 extends in a radial direction away from its respective annular chamber 130. Each of the outlet passages 122, 124, 126, and 128 meets its respective annular chamber 130 at rounded corners 132, as shown in FIGS. 5, 6, and 8, for flow efficiency for fluids rounding the corner to flow out passages 122, 124, 126, and 128. Those skilled in the art will readily appreciate that sharp or non-rounded corners can also be used without departing from the scope of this disclosure. Each annular passages 104, 110, 114, and 118 includes a respective inlet feed passage 134, 136, 138, and 140, shown in FIGS. 6 and 7, that feeds from a respective inlet 142, 144, 146, and 148 (shown in FIGS. 1 and 2) into a respective annular chamber 130 tangentially to induce spin on fluids flowing therethrough.

With reference now to FIGS. 3-4, the first annular passage 104 is shown with the other annular passages removed for sake of clarity in explaining the inlet feed and circulation of fluids, however, those skilled in the art will readily appreciate that the other three annular passages have similar inlet feeds and circulation. Inlet feed passage 134 feeds into annular passage 104 tangentially, e.g., through a tangential turn section 150, shown in FIGS. 3 and 4, to induce a flow in annular passage 104 that circulated in the direction identified in FIGS. 3 and 5 by the large circular arrows. This circulating flow generates centrifugal pressures for driving flow out of annular passage 104 through outlet passages 122. As shown in FIG. 5 by the three small arrows proximate one of the outlet passages 122, as the circulating flow approaches an outlet passage 122, part of the flow branches into the outlet passage 122, and part of the flow continues to circulate around annular passage 104 towards the next outlet passage. This flow pattern helps ensure all four of the outlet passages 122 receive an even amount of flow, even in situations where gravity, for example, would tend to favor flow through some passages over others, e.g. gravity in some situations would increase flow in downward facing outlet passages. While all of the annular passages 104, 110, 114, and 118 are shown and described as each having four respective outlets, those skilled in the art will readily appreciate that any suitable number of outlets can be used, and that the number of outlets from one annular passage to the other need not be equal per se.

Figure 9:
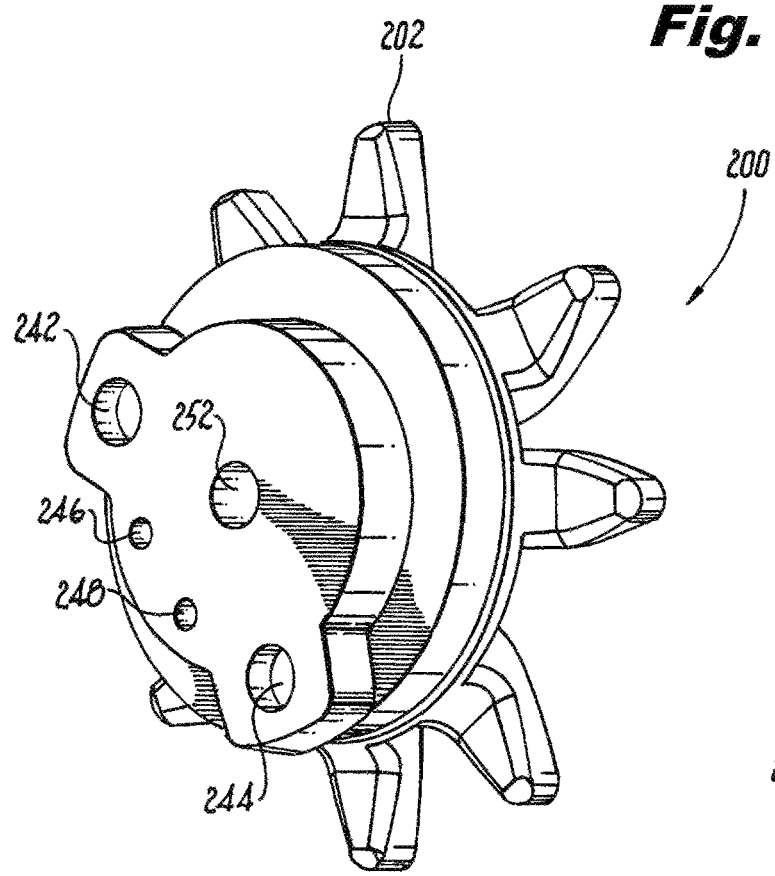
FIG. 9 is an inlet end perspective view of another exemplary embodiment of a manifold constructed in accordance with the present disclosure, showing the inlets.
Figure 10:
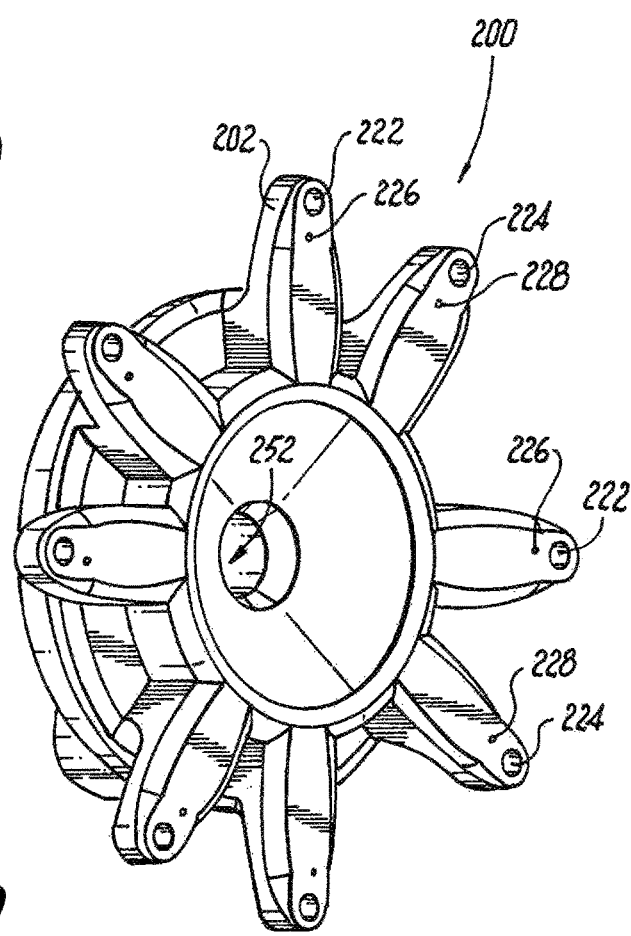
FIG. 10 is an outlet end perspective view of the manifold of FIG. 9, showing the outlets.
Figure 11:
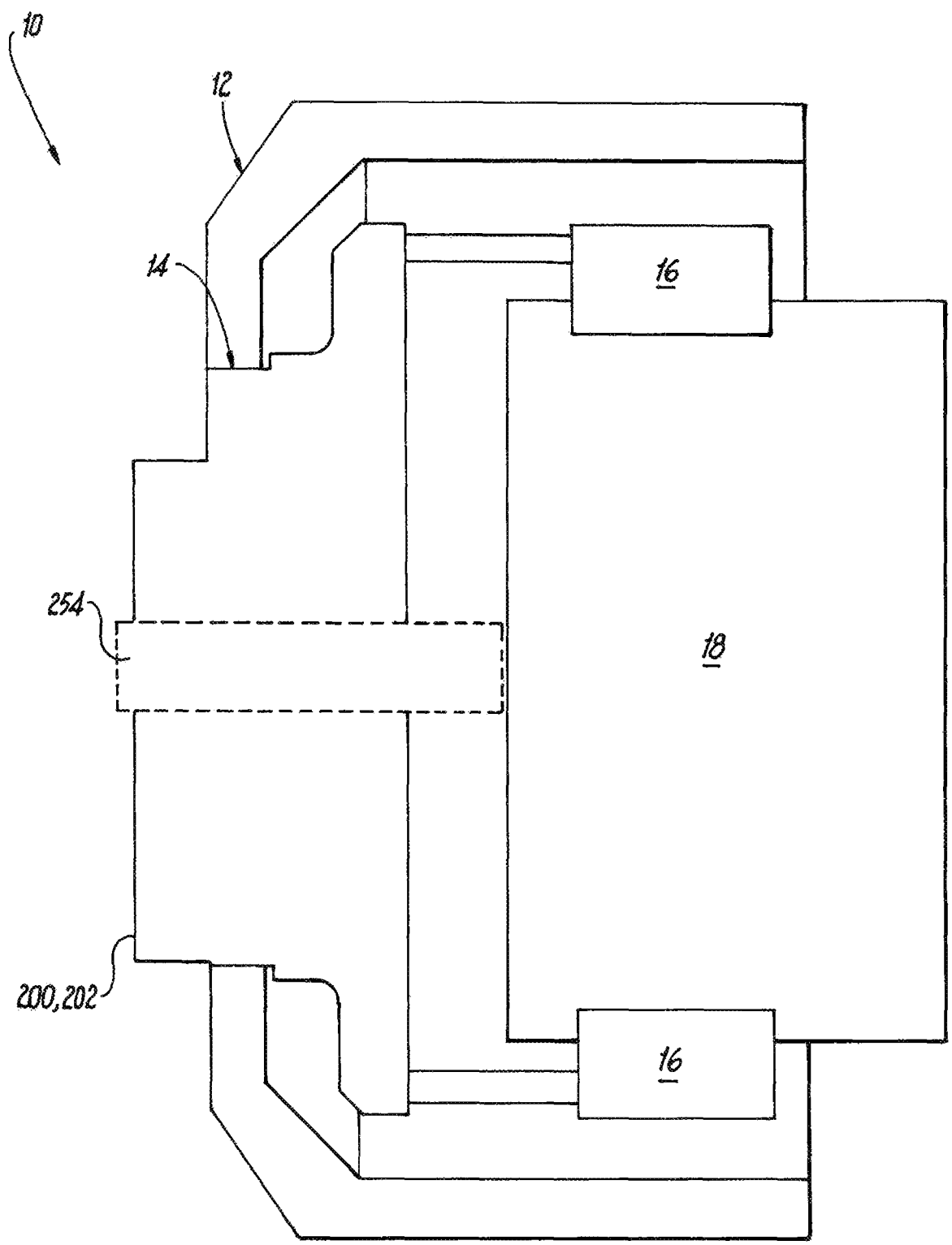
FIG. 11 is a schematic cross-sectional side elevation view of the manifold of FIG. 9, showing manifold connected in a system for distributing fuel to a fuel injector within a combustor case.

Referring now to FIGS. 9-11, another embodiment of a manifold 200 is shown in which the manifold body 202 defines a central passage 252, shown in FIGS. 9 and 10 therethrough configured to receive an ignitor 254 as shown in FIG. 11. Manifold body 202 is similar to manifold body 102 described above, including having four inlets 242, 244, 246, and 248 (shown in FIG. 9) with outlet passages 222, 224, 226, and 228 (shown in FIG. 10), respectively, but with reduced material around the outlet passages, and where the outlet passages 222, 224, 226, and 228 turn to exit flow axially rather than radially outward. Whereas the outlet passages in manifold 100 are fluid communication with a radially outward facing surface of the manifold 100 as shown in FIG. 1, the outlet passages of manifold 200 are in fluid communication with an axially facing surface of the manifold 200 as shown in FIG. 10. In both manifold 100 and manifold 200, the inlet feed passages are in fluid communication with an axial facing surface of the fluid manifold.

With reference now to FIG. 11, a system 10 includes a combustor case 12 defining a manifold receptacle bore 14 therethrough. A manifold 200 is seated in the manifold receptacle 14 to plug seal pressure within the combustor case 12. The outlet passages 222, 224, 226, and 228 of manifold 200 (shown in FIG. 10) are connected in fluid communication with respective fluid circuits of an injector 16, shown schematically as an annular ring in FIG. 11. For example, if two annular passages are configured for gaseous fuel, and if two annular passages are configured for liquid fuel (e.g. with generally smaller cross-sectional flow areas than in annular liquid passages), then manifold 200 and injector 16 can provide dual fuel, staged fuel injection for combustor 18. Those skilled in the art having the benefit of this disclosure will readily appreciate how to configure the annular passages for other single or multiple fluid, multiple-staged or single-staged configurations without departing from the scope of this disclosure. An ignitor 254 can be seated in central passage 252 of the manifold body 202 for ignition of fuel issued from the injector 16. If provided, the ignitor 254 should seal against the manifold 200 to prevent air from escaping the chamber. It should pass through the wall of the combustor at the tip of the ignitor 254 should be located within the combustion zone or right on the edge of the combustion zone.

It is contemplated that manifolds as described herein can be retrofitted into existing gas turbine engines. Moreover, while shown and described herein in the exemplary context of fuel manifolds, those skilled in the art will readily appreciate that manifolds as disclosed herein can be used in any suitable application where it is desired to maintain separate fluid circuits in a manifold, such as in food or chemical processing or the like.

A method of making a fluid manifold, e.g., manifolds 100 and 200, includes forming a manifold body, e.g., manifold body 102 or 202, with multiple, radially nested annular passages therein, e.g., annular passages 104, 110, 114, and 118, wherein each adjacent pair or the radially nested annular passages are separated by a respective wall, e.g., walls 108, 112, 116, of the manifold body. Forming the manifold body can include forming the manifold body including at least one wall separating radially nested passages using additive manufacturing.

Systems and methods as described herein allow for receiving fluids from multiple sources, and for delivering to multiple outlets for each source. It is contemplated that manifolds as described herein can benefit from unitary structure, as a single body with the capability to have multiple integral manifolds therein. Each manifold passage can be able to divide fluid evenly among multiple individual circuits, e.g., for fuel injection. Manifolds as described herein can operate better at lower flow rates or power levels than traditional manifold arrangements. Manifolds as described herein can minimize manifold size for efficient packaging or advantageous envelope for multiple fluid circuits. Manifolds as described herein can fit within envelopes designed for traditional manifold arrangements, e.g., without taking up room outside a combustor case.

The methods and systems of the present disclosure, as described above and shown in the drawings, provide for manifolds with superior properties including compact form factor. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fluid manifold for providing fuel to a gas turbine, comprising:
    a manifold body including
        a first annular passage defined along and between a first wall of the manifold body and a second wall of the manifold body; and
        a second annular passage defined along and between the second wall of the manifold body and a third wall of the manifold body, wherein
        each annular passage of the first and second annular passages feeds into a respective annular chamber defined between a respective pair of directly adjacent walls of the first, second, and third walls, and includes a respective plurality of distinct outlet passages branching off the respective annular chamber, the first, second, and third walls are trumpet shaped walls that extend axially along the first and second annular passage and turn radially along the respective annular chamber.

2. The fluid manifold as recited in claim 1, further comprising a third annular passage nested radially inward of the second annular passage, wherein the third annular passage is defined between the third wall of the manifold body and a fourth wall of the manifold body radially inward from the third wall of the manifold body.

3. The fluid manifold as recited in claim 2, further comprising at least one additional annular passage, wherein a first one of the at least one additional annular passage is nested radially inwardly from the third annular passage and is defined between the third wall of the manifold body and a fourth wall of the manifold body radially inward from the third wall of the manifold body, and wherein any additional ones of the at least one additional annular passage are each nested successively inwardly from a respective annular passage and are respectively defined between two respective walls of the manifold body.

4. The fluid manifold as recited in claim 1, wherein the respective plurality of distinct outlet passages is in fluid communication with a radially outward facing surface of the fluid manifold.

5. The fluid manifold as recited in claim 1, wherein the respective plurality of distinct outlet passages is in fluid communication with an axially facing surface of the fluid manifold.

6. The fluid manifold as recited in claim 1, wherein each outlet passages of the respective plurality of distinct outlet passages extends in a radial direction from the respective annular chamber.

7. The fluid manifold as recited in claim 6, wherein each outlet passages of the respective plurality of distinct outlet passages meets the respective annular chamber at a rounded corner.

8. The fluid manifold as recited in claim 1, wherein each of the first annular passage and the second annular passage is in fluid communication with a respective inlet feed passage that feeds into a respective annular passage of the first annular passage and the second annular passage tangentially to induce spin on fluids flowing therethrough.

9. The fluid manifold as recited in claim 8, wherein the respective inlet feed passage is in fluid communication with an axial facing surface of the fluid manifold.

10. The fluid manifold as recited in claim 1, wherein the manifold body defines a central passage therethrough configured to receive an ignitor of the gas turbine.

11. The fluid manifold as recited in claim 1, wherein the manifold body including the first wall, second wall, and third wall, is a single monolithic object.

12. A system comprising:
    a combustor case defining a manifold receptacle bore therethrough;
    a manifold including a manifold body seated in the manifold receptacle to plug seal pressure within the combustor case, wherein the manifold body including
        a first annular passage defined along and between a first wall of the manifold body and a second wall of the manifold body, wherein the second wall is radially inward from the first wall, and
        a second annular passage nested radially inward of the firsts annular passage, wherein the second annular passage is defined along and between the second wall of the manifold body and a third wall of the manifold body radially inward from the second wall of the manifold body, wherein
        each annular passage of the first and second annular passage feeds into a respective annular chamber defined between a respective pair of directly adjacent walls of the first, second, and third walls, and includes a respective plurality of distinct outlet passages branching off the respective annular chamber, the first, second, and third walls are trumpet shaped walls that extend axially along the first and second annular passage and turn radially outward along the respective annular chamber; and an injector including first and second fuel circuits each in fluid communication with the first and second annular passages, respectively.

13. The system as recited in claim 12, wherein the manifold includes two additional annular passages in addition to the first annular passage and the second annular passage, and wherein each of the two additional annular passages is in fluid communication with a respective fuel circuit in the injector for dual fuel, dual stage fuel injection.

14. The system as recited in claim 12, further comprising an ignitor seated in a central passage of the manifold body for ignition of fuel issued from the injector.

\* \* \* \* \*